(12) United States Patent
Kim et al.

(10) Patent No.: US 7,746,947 B2
(45) Date of Patent: Jun. 29, 2010

(54) METHOD AND APPARATUS FOR TRANSMITTING/RECEIVING DATA IN A MULTIPLE-INPUT MULTIPLE-OUTPUT COMMUNICATION SYSTEM

(75) Inventors: Sung-Jin Kim, Suwon-Si (KR); Ho-Jin Kim, Seoul (KR); Kwang-Bok Lee, Seoul (KR); Ki-Ho Kim, Seoul (KR); Hyoung-Woon Park, Seongnam-si (KR); Jae-Hak Chung, Seoul (KR); Chan-Byoung Chae, Seoul (KR); Won-Il Roh, Yongin-si (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 1260 days.

(21) Appl. No.: 11/274,662

(22) Filed: Nov. 15, 2005

(65) Prior Publication Data
US 2006/0120478 A1  Jun. 8, 2006

Related U.S. Application Data

(60) Provisional application No. 60/628,033, filed on Nov. 15, 2004.

(30) Foreign Application Priority Data
Nov. 14, 2005  (KR)  ....................... 10-2005-0108705

(51) Int. Cl.
H04B 7/04 (2006.01)
(52) U.S. Cl. ......................................... 375/267; 455/69
(58) Field of Classification Search ................. 375/260, 375/267, 299, 347; 455/69, 101
See application file for complete search history.

(56) References Cited

U.S. PATENT DOCUMENTS

| 2002/0187753 | A1* | 12/2002 | Kim et al. ..................... 455/69 |
| 2003/0060173 | A1  | 3/2003  | Lee et al. |
| 2003/0181170 | A1  | 9/2003  | Sim |
| 2004/0209579 | A1  | 10/2004 | Vaidyanathan |
| 2005/0281221 | A1* | 12/2005 | Roh et al. .................... 370/328 |
| 2006/0039312 | A1* | 2/2006  | Walton et al. ................ 370/319 |

(Continued)

FOREIGN PATENT DOCUMENTS

KR  1020030075883  9/2003

OTHER PUBLICATIONS

June Chul Roh et al., An Efficient Feedback Method for MIMO Systems with Slowly Time-Varying Channels, Wireless Communications and Networking Conference, Mar. 21-25, 2004.

*Primary Examiner*—Young T. Tse
(74) *Attorney, Agent, or Firm*—The Farrell Law Firm, LLP

(57) ABSTRACT

A multiple-input multiple-output (MIMO) communication system is provided for communication between a transmission apparatus having a plurality of transmission antennas and a reception apparatus having a plurality of reception antennas. The reception apparatus performs singular value decomposition (SVD) on channel information for a channel established to the transmission apparatus, and feeds back the SVD-decomposed channel information to the transmission apparatus. The transmission apparatus receives the SVD-decomposed channel information from the reception apparatus, performs QR decomposition on the received SVD-decomposed channel information, and sets multiple transmission antennas to be allocated to the channel, thereby performing beamforming.

12 Claims, 3 Drawing Sheets

U.S. PATENT DOCUMENTS

2006/0239374 A1* 10/2006 Aldana et al. ............... 375/267
2007/0159393 A1*  7/2007 Imai ........................... 342/445
2007/0258392 A1* 11/2007 Larsson et al. ............. 370/310
2008/0031125 A1*  2/2008 Vandewiele ................. 370/203
2008/0108310 A1*  5/2008 Tong et al. ................... 455/69

* cited by examiner

METHOD AND APPARATUS FOR TRANSMITTING/RECEIVING DATA IN A MULTIPLE-INPUT MULTIPLE-OUTPUT COMMUNICATION SYSTEM

PRIORITY

This application claims the benefit under 35 U.S.C. §119 (a) of an application entitled "Multiple-Input Multiple-Output Communication System, and Method and Apparatus for Transmitting/Receiving Data in the Same" filed in the United States Patent and Trademark Office on Nov. 15, 2004 and assigned Ser. No. 60/628,033, and also filed in the Korean Intellectual Property Office on Nov. 14, 2005 and assigned Serial No. 2005-108705, both of which the entire contents are hereby incorporated by reference.

BACKGROUND OF THE INVENTION

1. Field of the Invention

The present invention relates generally to a data transmission/reception method and apparatus for a Multiple-Input Multiple-Output (MIMO) communication system, and in particular, to a method and apparatus for transmitting/receiving data using Singular Value Decomposition (SVD) and QR decomposition in a MIMO communication system.

2. Description of the Related Art

A MIMO communication system uses one of the technologies for providing high channel performance through wireless fading channels. The main goal in the MIMO communication system is channel performance, and in particular, providing optimal-quality channels to users and increasing data throughput using multi-user diversity is becoming increasingly important.

FIG. 1 is a block diagram illustrating a conventional multiuser Multiple-Input Single-Output (MISO) system. A method for transmitting data in the multiuser MISO system in which, as illustrated, a transmitter includes multiple antennas and a receiver includes a single antenna will now be described.

In FIG. 1, a signal y received at the receiver equals Hx+n. Herein, H denotes a channel matrix, x denotes a signal vector obtained by performing unitary transformation on an input signal s and outputting the resulting signal through the antennas at the transmitter, and equals Ws, and n denotes a noise vector. W denotes a unitary transformation matrix of the transmitter and can be represented by $Q^H$, and the transmitter adopts beamforming that uses the unitary transformation matrix W. Herein, Q denotes an orthogonal matrix, and $QQ^H=I$, where a superscript H denotes conjugate transposition.

Therefore, y becomes HWs+n, and if H is subject to QR decomposition, y becomes $RQQ^H$s+n=Rs+n, thus reducing calculations. R denotes a lower triangular matrix. That is, if a channel matrix is subject to QR decomposition, y is transformed into a formula including lower triangular matrices, thus reducing its calculations.

However, unlike the receivers of FIG. 1, if a receiver has multiple antennas, the receiver must use information on all channels for the multiple antennas, thus increasing the amount of data being fed back from the receiver to the transmitter and also increasing calculations at the transmitter. In this case, the receiver must perform repeated calculations through several steps in order to decompose a channel matrix H into lower triangular matrices to provide the optimal channel performance.

SUMMARY OF THE INVENTION

In order to substantially overcome the aforementioned disadvantages of the prior art, the present invention provides a data transmission/reception method and apparatus for modeling a multiuser MIMO system on a multiuser MISO system by decomposing a single-user MIMO channel in the multiuser MIMO system.

The present invention also provides a data transmission method and apparatus for performing QR decomposition on channel information being fed back from a receiver using SVD, and for performing beamforming on the QR decomposition result.

The present invention further provides a method and apparatus for performing SVD on channel information and feeding back the SVD decomposition result to a transmitter.

According to one aspect of the present invention, there is provided a multiple-input multiple-output (MIMO) communication system for communication between a transmission apparatus having a plurality of transmission antennas and a reception apparatus having a plurality of reception antennas. The reception apparatus performs singular value decomposition (SVD) on channel information for a channel established to the transmission apparatus, and feeds back the SVD-decomposed channel information to the transmission apparatus. The transmission apparatus receives the SVD-decomposed channel information from the reception apparatus, performs QR decomposition on the received SVD-decomposed channel information, and sets multiple transmission antennas to be allocated to the channel, thereby performing beamforming.

Preferably, the reception method includes performing SVD decomposition on a channel matrix $H_k$ for multiple reception antennas, decomposing the channel matrix $H_k$ into an effective channel matrix $F_k$ for a single antenna using a matrix for transforming the channel matrix $H_k$ into the effective channel matrix $F_k$, and feeding back the effective channel matrix $F_k$ to the transmission apparatus. The transmission apparatus receives the effective channel matrix $F_k$, and performs QR decomposition on the received effective channel matrix $F_k$, thereby performing beamforming.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for clarity and conciseness.

Figure 1:
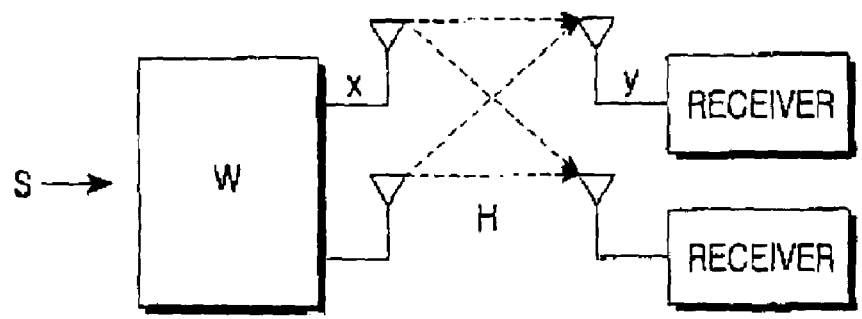
FIG. 1 is a block diagram illustrating a conventional multiuser Multiple-Input Single-Output (MISO) system.
Figure 2:
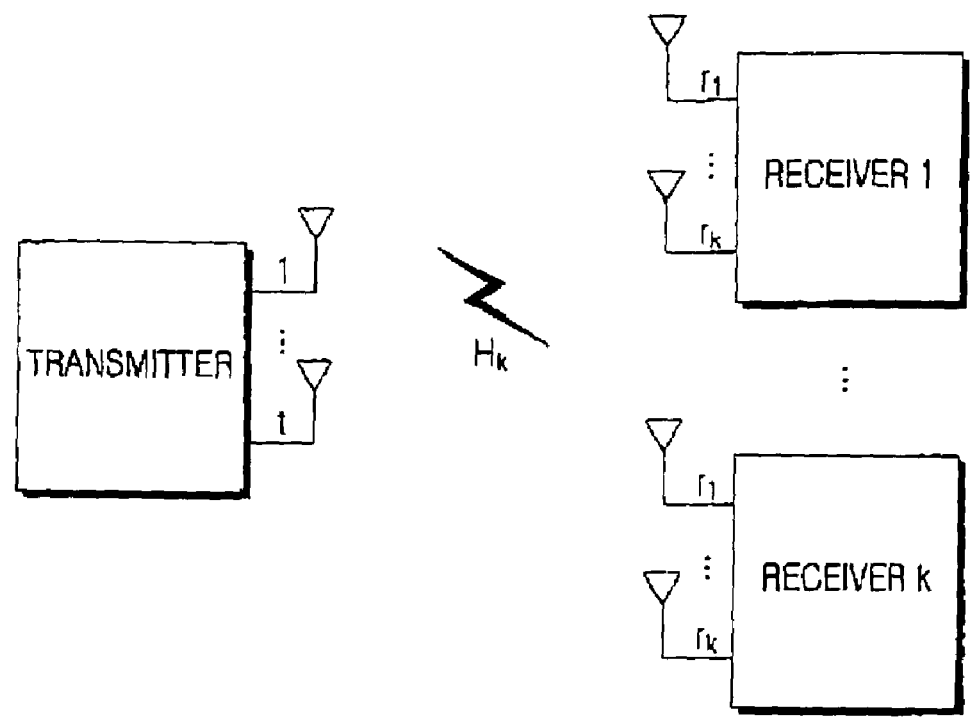
FIG. 2 is a block diagram illustrating a multiuser MIMO communication system to which a preferred embodiment of the present invention is applied.

FIG. 2 is a block diagram illustrating a multiuser MIMO communication system to which a preferred embodiment of the present invention is applied.

In the MIMO communication system illustrated in FIG. 2, a transmitter having a plurality, t, of transmission antennas communicates with receivers each having a plurality, $r_k$, of reception antennas using K wireless downlinks. Therefore, the total number, r, of reception antennas $$\sum_{k=1}^{K} r_k.$$

A channel output $y_k$ of a receiver k is modeled on $H_k x + z_k$, where x denotes a t×1 input signal vector transmitted from a transmission antenna to the receiver, and a t×1 vector $z_k$ denotes a random noise applied to the receiver k. A channel $H_k$ is an $r_k$×t complex matrix.

In the system of FIG. 2, the receiver decomposes a MIMO channel $H_k$ for a single user into a multiuser MISO channel $F_k$ through transformation and feeds back the resulting value to the transmitter. This can be expressed as Equation (1).

$$F_k = U_k^H H_k \quad (1)$$

where $U_k^H$ denotes a matrix for transforming the MIMO channel $H_k$ for a single user into the multiuser MISO channel $F_k$. That is, $F_k$ is one effective channel matrix selected from channels $H_k$ for the $r_k$ reception antennas.

If the $H_k$ is subject to SVD decomposition at the receiver, it can be expressed as $H_k = U_k D_k V_k^H$, where $D_k$ denotes a diagonal matrix indicating a size and $V_k^H$ denotes a matrix indicating a direction.

Therefore, $F_k$ can be expressed as Equation (2).

$$F_k = U_k^H U_k D_k V_k^H = D_k V_k^H \quad (2)$$

Next, the transmitter performs beamforming by applying QR decomposition to a set $F = [F_1^T, \ldots, F_k^T]^T$ for each receiver for the effective channel matrix $F_k$ of Equation (2). That is, F indicates that an effective broadcasting channel and can be treated as a multiuser MISO channel. In other words, the transmitter allocates antennas to individual channels in the order of a channel having the greatest $D_k$ and determines beams of the antennas accordingly.

The effective broadcasting channel F, if it undergoes QR decomposition, is expressed as F=RW, where R denotes an r×t lower triangular matrix and W denotes a t×t matrix having orthogonal rows.

Assuming that a unitary matrix used for beamforming is denoted by $W^H$ and a transmission signal input to the transmitter is denoted by s, a channel output y of the receiver can be expressed as Equation (3).

$$\begin{aligned} y &= Fx + z \\ &= RWW^H s + z \\ &= Rs + z \end{aligned} \quad (3)$$

where $y = [y_1^T, \ldots, y_k^T]^T$, and $z = [z_1^T, \ldots, z_k^T]^T$. That is, the present invention is characterized by transmitting/receiving data by modeling a multiuser MIMO system on a multiuser MISO system by decomposing a single-user MIMO channel $H_k$ into $F_k$ in the multiuser MIMO system.

Figure 3:
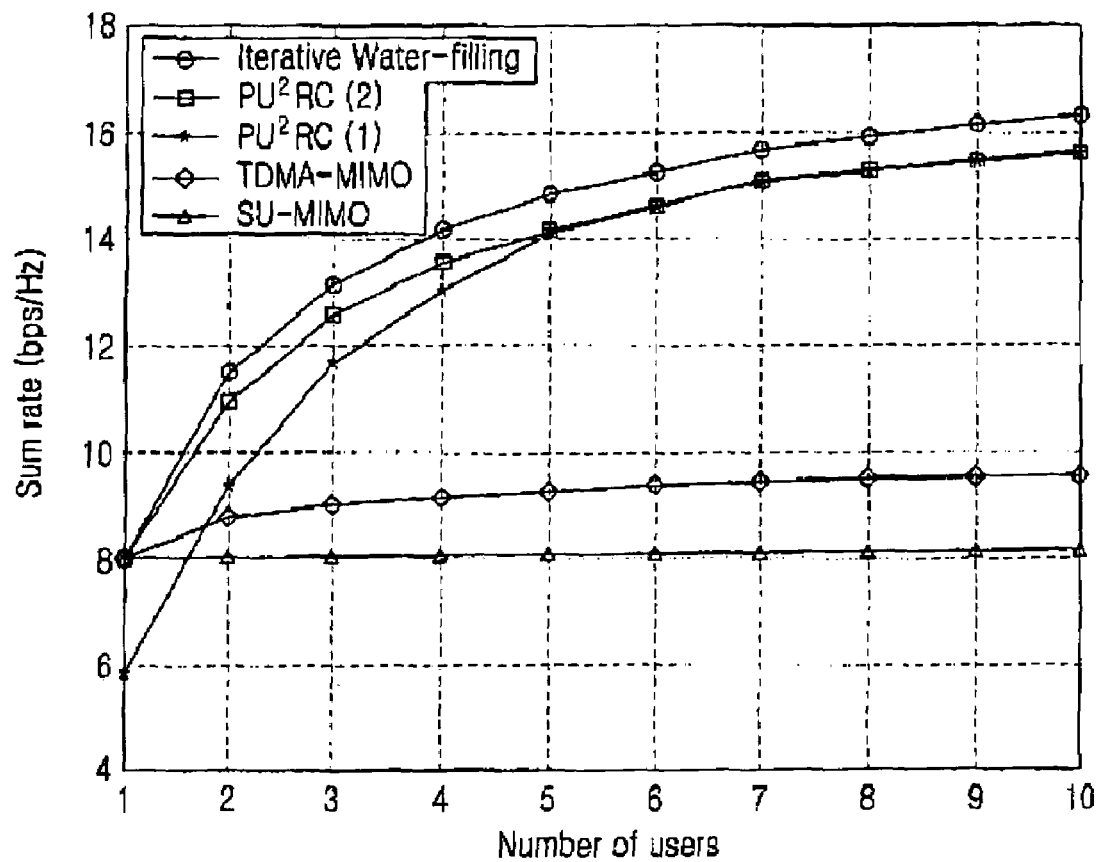
FIGS. 3 and 4 are graphs illustrating comparative simulation results between the present invention and the prior art.
Figure 4:
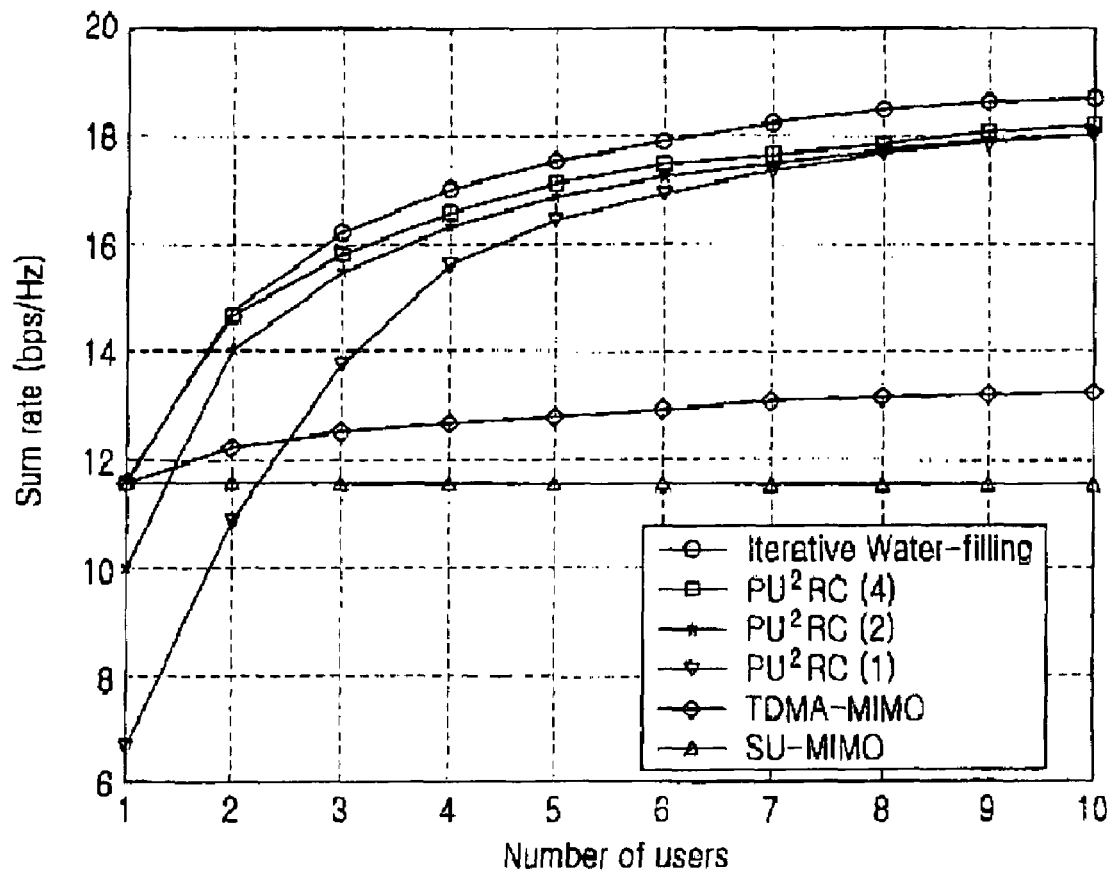

FIGS. 3 and 4 are graphs illustrating a comparison between the present invention and the prior art in terms of sum rate performance for downlink channels, determined depending on the number of users, i.e., the number of receivers.

Herein, a signal-to-noise ratio (SNR) is assumed to be 10 dB. In addition, SU-MIMO indicates a single-user rate acquired by an SVD-based optimal water filtering solution taking point-to-point link communication into consideration, and is equal to TDMA-MIMO having one user. The TDMA-MIMO shows a lower gain for the increase in number of users. PU$^2$RC (Per-user Unitary Feedback/Beamforming and Rate Control) corresponds to an embodiment of the present invention, and a parenthesized number indicates the number of effective channel vectors. As illustrated, for the single user, PU$^2$RC is equal in performance to SU-MIMO and TDMA-MIMO. However, when the number of users is large enough, PU$^2$RC is similar in performance to iterative water filtering that realizes the optimal performance.

It is assumed in FIG. 3 that the system has four transmission antennas and two reception antennas, and it is assumed in FIG. 4 that the system has four transmission antennas and four reception antennas.

In FIG. 3, therefore, the number of effective channel vectors is two, and feedback performance for one effective channel vector closely approximates feedback performance for two effective channel vectors when the number of users is five.

In FIG. 4, therefore, three different kinds of feedback information can be used. That is, one-effective channel vector-based feedback information, two-effective channel vector-based feedback information and four-effective channel vector-based feedback information can be used. The performance based on the number of effective channel vectors will be described below. The number of users should be increased in order for performance for one or two effective channel vectors to be equal to performance for four effective channel vectors. That is, when the number users is large enough, the present invention can acquire the same performance even though it decreases the number of effective channel vectors, i.e., decreases the amount of information being fed back from the transmitter to the receiver.

As can be understood from the foregoing description, the present invention models a multiuser MIMO channel on a multiuser MISO channel, thereby reducing calculations at the transmitter and the receiver, and also reducing data throughput.

In addition, the transmitter performs QR decomposition and antenna-setting using channel information which is fed back from the receiver through SVD, thus improving the capacity gain of multichannel selection diversity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting and receiving data in a multiple-input multiple-output (MIMO) communication system including a transmission apparatus having a plurality of transmission antennas for communicating with a reception apparatus having a plurality of reception antennas, the method comprising:

receiving, by the transmission apparatus from the reception apparatus, singular value decomposition (SVD)-decomposed channel information for a channel established between the transmission apparatus and the reception apparatus;

performing, by the transmission apparatus, QR decomposition on the received SVD-decomposed channel information;

setting, by the transmission apparatus, multiple transmission antennas from among the plurality of transmission antennas, to be allocated to the channel, according to a result of the QR decomposition; and transmitting, by the transmission apparatus, data using the set multiple transmission antennas, wherein the SVD-decomposed channel information is from an effective multiple-input single-output (MISO) channel matrix $F_k$, which is transformed by a MIMO channel matrix $H_k$ for the reception apparatus.

2. The method of claim 1, further comprising:

performing, by the reception apparatus, SVD on the $H_k$ for multiple reception antennas from among the plurality of reception antennas;

decomposing, by the reception apparatus, the $H_k$ into the $F_k$ for a single reception antenna from among the plurality of reception antennas, using a matrix for transforming the $H_k$ into the $F_k$; and feeding back, by the reception apparatus, the $F_k$ to the transmission apparatus.

3. The method of claim 2, further comprising:

receiving, by the transmission apparatus, the $F_k$; and performing the QR decomposition on the received $F_k$.

4. The method of claim 1, wherein the $F_k$ is expressed by:

$$F_k = U_k^H H_k,$$

wherein $U_k^H$ denotes a matrix for transforming the $H_k$ for a single user into the $F_k$ for a multiuser.

5. A method for transmitting and receiving data in a multiple-input multiple-output (MIMO) communication system including a reception apparatus having a plurality of reception antennas for communicating with a transmission apparatus having a plurality of transmission antennas, the method comprising:

transforming, by the reception apparatus, a MIMO channel matrix $H_k$ into an effective multiple-input single-output (MISO) channel matrix $F_k$ by performing singular value decomposition (SVD) on the $H_k$; and feeding back, by the reception apparatus, SVD-decomposed channel information of the $F_k$ to the transmission apparatus.

6. The method of claim 5, wherein performing SVD on the $H_k$ comprises:

performing, by the reception apparatus, the SVD on the $H_k$ for multiple reception antennas from among the plurality of reception antennas; and decomposing, by the reception apparatus, the $H_k$ into the $F_k$ for a single reception antenna from among the plurality of reception antennas using a matrix for transforming the $H_k$ into the $F_k$.

7. A multiple-input multiple-output (MIMO) communication system comprising a transmission apparatus including a plurality of transmission antennas for communicating with a reception apparatus including a plurality of reception antennas, wherein the transmission apparatus receives from the reception apparatus singular value decomposition (SVD)-decomposed channel information for a channel established between the transmission apparatus and the reception apparatus, performs QR decomposition on the received SVD-decomposed channel information, sets multiple transmission antennas, from among the plurality of transmission antennas, to be allocated to the channel, according to a result of the QR decomposition, and transmits data using the set multiple transmission antennas, and wherein the SVD-decomposed channel information is from an effective multiple-input single-output (MISO) channel matrix $F_k$, that is transformed by a MIMO channel matrix $H_k$ for the reception apparatus.

8. The MIMO communication system of claim 7, wherein the $F_k$ is expressed by:

$$F_k = U_k^H H_k,$$

wherein $U_k^H$ denotes a matrix for transforming the $H_k$ for a single user into the $F_k$ for a multiuser.

9. The MIMO communication system of claim 7, wherein the reception apparatus performs SVD on the $H_k$ for multiple reception antennas from among the plurality of reception antennas, decomposes the $H_k$ into the $F_k$ for a single reception antenna, from among the plurality of reception antennas, using a matrix for transforming the $H_k$ into the $F_k$, and feeds back the $F_k$ to the transmission apparatus.

10. The MIMO communication system of claim 9, wherein the transmission apparatus receives the $F_k$, and performs the QR decomposition on the received $F_k$.

11. A multiple-input multiple-output (MIMO) communication system comprising a reception apparatus including a plurality of reception antennas for communicating with a transmission apparatus including a plurality of transmission antennas, wherein the reception apparatus transforms a MIMO channel matrix $H_k$ into an effective multiple-input single-output (MISO) channel matrix $F_k$ by performing singular value decomposition (SVD) on the $H_k$, and feeds back SVD-decomposed channel information of the $F_k$ to the transmission apparatus.

12. The MIMO communication system of claim 11, wherein the reception apparatus performs SVD on the $H_k$ for multiple reception antennas from among the plurality of reception antennas, and decomposes the $H_k$ into the $F_k$ for a single reception antenna, from among the plurality of reception antennas, using a matrix for transforming the $H_k$ into the $F_k$.

* * * * *